Figure 1:
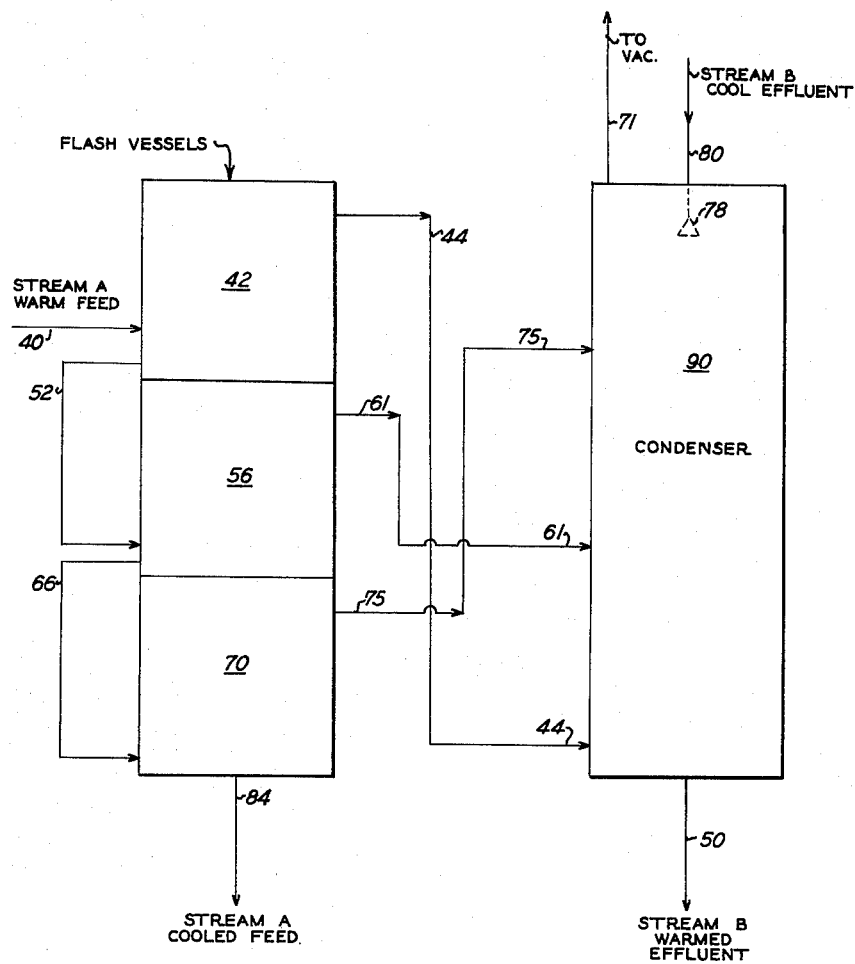

Sept. 21, 1965   J. W. COLTON ETAL   3,207,677
FLASH VAPORIZATION DISTILLATION APPARATUS
Filed Sept. 22, 1960   2 Sheets-Sheet 2

3,207,677
FLASH VAPORIZATION DISTILLATION APPARATUS
John White Colton, Pelham Manor, and Irwin B. Margiloff, New York, N.Y., assignors to Halcon International, Inc., a corporation of Delaware
Filed Sept. 22, 1960, Ser. No. 57,739
2 Claims. (Cl. 202—173)

This invention relates to a process for passing sensible heat from a first material to a second material in a semi-direct manner, more particularly to such a process wherein at least one component is vaporized from the first material and the resulting vapor is contacted with and condensed on the second material, and especially to such processes wherein both materials are liquids and the vapor is contacted with the second material in a counter-current manner and substantially adiabatically.

This invention also relates to apparatus adapted for use in carrying out such processes, and especially to such apparatus including a series of evaporative cooling zones arranged to operate at progressively lower pressures, each such zone being in vapor contact with a series of condensation warming zones arranged to operate at progressively lower pressures.

Heat exchange between two materials is a well known operation, and is usually performed in an indirect manner, i.e. through a barrier between the two materials such as is present in a tube and shell heat exchanger. For some purposes such equipment is too costly or cumbersome and is also unnecessary where partial commingling of the materials is permissible. The art is confronted by the problem of providing even more economical and efficient heat exchange methods and means especially where partial commingling of two or more materials is permissible.

The discoveries associated with the invention relating to solution of the above problems and the objects achieved in accordance with the invention as described herein include the provision of: a process for passing heat from a relatively warm first material to a relatively cool second material which comprises vaporizing at least one component of said first material and contacting the resulting vapor with the second material, whereby the vapor is condensed, a first portion of the vapor being removed from the first material in a first zone (maintained at any convenient pressure at, above or below atmospheric) and a subsequently separated portion of such vapor is removed from the first material in another zone maintained at a lower pressure, the portions of vapor being contacted with the second material in a counter-current and sequential manner such that the coolest portion of vapor first contacts the second material and the next warmer portion of the vapor next contacts the second material; and so on for any convenient number of vaporization zones and condensation contact points or zones; such processes wherein three portions of vapor are removed from the first material, the first being removed at a lowest pressure of about 330 mm. Hg., the second being removed at a lowest pressure of about 235 mm. Hg., the third being removed at a lowest pressure of about 140 mm. Hg.; such processes wherein both materials are liquids, and the second material is in finely divided form when contacted with the vapors in sequential manner; an apparatus including the combination of a substantially cylindrical, vertical vessel provided with two vertical inner walls dividing the interior thereof into three sections, the second or middle section being provided with two vertical separator walls dividing it into three ducts, the first section being provided with two horizontal plates spaced so as to divide it into three sub-vessels, means for feeding and dispersing relatively warm fluid into the top sub-vessel, means for transferring fluid from the top sub-vessel to the next lower sub-vessel, means for transferring fluid from the latter to the lowest sub-vessel and means for removing cooled fluid from the lower sub-vessel, means for feeding and dispersing cooling fluid into the upper part of the third or condensing section and means for removing warmed fluid from the lower part thereof, one of above mentioned ducts being adapted to transport vapor from the upper part of the lower subsection to the upper region of the third section, another such duct being adapted to transfer vapor from the upper part of the middle sub-vessel to approximately the mid part of the third section, and the third such duct being adapted to transfer vapor from the upper part of the upper sub-vessel to the lower region of the third section, and vacuum producing means connected to the upper part of the third section; and other objects which will be apparent as details or embodiments of the invention are set forth hereinafter and in the drawing.

Figure 2:
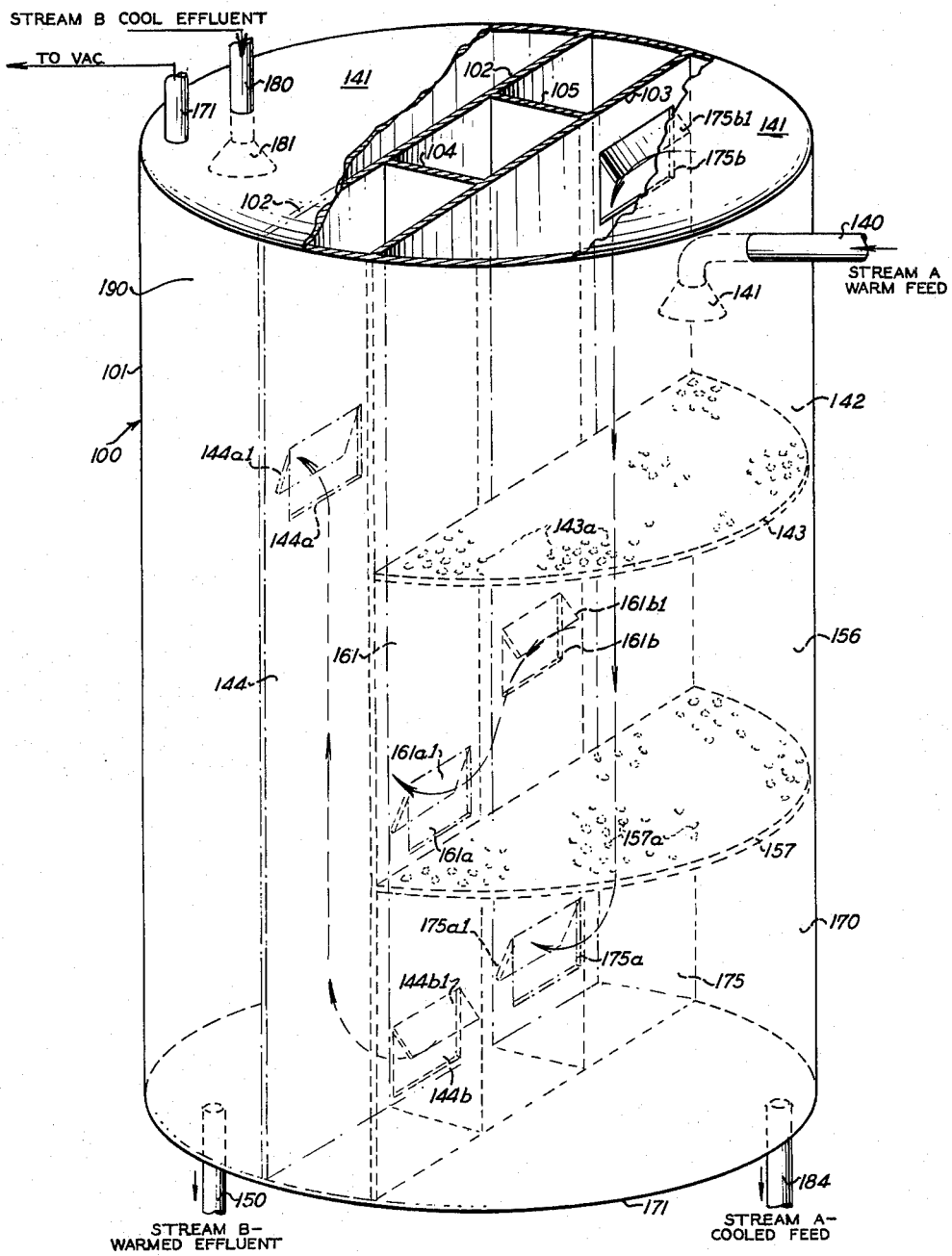

FIGURES 1 and 2 of the accompanying drawing are illustrations of preferred embodiments of the invention, the first being schematic and the second being in elevation and partially in section.

In order to indicate still more fully the nature of the present invention, the following examples of typical procedures are set forth in which parts and percent mean parts and percent by weight, respectively, unless otherwise indicated, it being understood that these examples are presented as illustrative only and are not intended to limit the scope of the invention.

*Example 1*

In this embodiment of the invention, the process is carried out in apparatus, as illustrated in FIGURES 1 and 2.

Referring to FIGURE 1, the feed stream enters through line 40 and is sprayed into the first flash vessel 42 (spray head not shown) maintained under reduced pressure via vacuum means (not shown) connected as described below, and some of the water therein is vaporized. The vapor is passed through line 44 to the lower region of vessel 90 where it contacts cooling liquid, e.g. dispersed through spray head 78, whereby the vapor is condensed and mixes with the cooling liquid. The cooling liquid is passed to the spray head 78 via line 80. After its temperature is raised the liquid from the bottom of vessel 90 is removed via line 50.

After the temperature of the liquid in vessel 42 is lowered, this liquid is passed via line 52 by gravity or a pump (not shown) to flash vessel 56, wherein it is sprayed (spray means not shown). Flash vessel 56 is maintained at a lower pressure than vessel 42 via vacuum means (not shown) connected as described below, and some of the water therein is vaporized. The vapor is passed via line 61 into condenser vessel 90 at a point higher up than where line 44 enters this vessel, wherein it contacts the cooling liquid, sprayed as already described, and is condensed and mixed with the cooling liquid.

After its temperature is lowered, the liquid from the bottom of vessel 56 is passed via line 66 by gravity flow or a pump (not shown) and is sprayed into flash vessel 70 (spray means not shown). This vessel is maintained under a lower pressure than vessel 46 via vacuum means (not shown) connected as described below, and some of the water therein is vaporized. This vapor is passed via line 75 into the upper region of condenser vessel 90 (at a point of entry above that of line 61), wherein it contacts cooling liquid, sprayed as described above, whereby the vapor is condensed and mixed with the cooling liquid.

The cooled liquid in the lower region of vessel 70 is passed via line 84 as feed to the next stage of the process.

A vacuum means (not shown) is connected to a condenser 90 through line 71, and during operation, there is a pressure gradient in the condenser, the higher pressure being in the lower end thereof. The lines 44, 61, and 75 are connected to the condenser in spaced relationship and arrangement so that the desired vacuum is applied to the flash vessels 42, 56, and 70, respectively. If desired, vessel 90 may be provided with baffles (not shown) to help regulate or increase the pressure gradient.

A preferred apparatus for carrying out the foregoing process is illustrated in FIGURE 2. The substantially cylindrical vertical vessel 100 is provided with outer wall 101, top 141 and bottom 171. The interior thereof, is divided into three sections by vertical inner walls 102 and 103. The middle or second section is provided with two vertical separator walls 104 and 105 which divide it into three ducts or passageways. The first section is provided with two horizontal plates 143 and 157 dividing it into three sub-vessels arranged one above the other, 170, 156, and 142. This section is provided with feed means (line 140) for introducing and dispersing (e.g., via spray head 141) a warm fluid into the upper vessel and means for transferring and dispersing fluid from this vessel to the next lower lower vessel and from the latter to the lowest vessel, e.g., sieve perforations 143a in plate 143 and 157a in plate 157, and the lowest sub-vessel is provided with line 184 for removing cooled fluid. The third section is a condensing section and is provided with means for introducing cooling fluid in the upper end, such as line 180 and spray head 181, and with means for removing warmed fluid from the lower end thereof, e.g., line 150. Duct 144 connects the upper region of sub-vessel 170 with the upper region of condenser section 190 via connections 144a and 144b. These connections may be provided with optional damper or baffle means 144a1 and 144b1. Duct 175 connects the upper part of sub-vessel 142 with the lower region of condenser section 190 via connection means 175a and 175b, which may be provided with optional baffle or damper means 175a1 and 175b1. Duct 161 connects the upper region of vessel 156 with the middle region of condenser section 190 via connections 161a and 161b, which may be provided with baffle or damper means 161a1 and 161b1.

Condenser section 190 is provided with line 171 connecting it to vacuum means (not shown).

In operation, the warm feed is introduced into sub-vessel 142 and some of the liquid evaporates. Vapor is conducted to the lower region of condenser section 190. The openings in plate 143 are adjusted so as to maintain a body fluid on the plate, and also allow some fluid to trickle through to the lower sub-vessel. In the latter sub-vessel the liquid is subjected to a lower pressure and the additional vapor formed is conducted to the mid region of condenser section 190. A liquid body is maintained on plate 157 and some liquid trickles through to the sub-vessel 170 where it is subjected to a lower pressure and additional vapor is formed. This vapor is conducted to the upper region of condenser section 190 and noncondensables are removed via line 171.

The cooled fluid is withdrawn via line 184, and the warmed fluid (stream B) is withdrawn via line 150. The flow rates and sizes of passageways and vessels are such as to maintain a pressure gradient in the condenser section 190, the lowest pressure being at the upper region thereof, and the sub-vessels 142, 156, and 170 are subjected to progressively lower pressures.

Additional sub-vessels and corresponding ducts may be included, if desired.

The process may be conducted in a continuous, semicontinous, or batch manner.

In this example, twenty thousand pounds of 50 percent sodium hydroxide solution are introduced as stream B, entering at 100° C. with a partial pressure of water of about 130 mm. Hg. Ten thousand pounds of 40 percent calcium chloride brine at 100° C. are introduced as stream A with a partial pressure of water of about 355 mm. Hg.

The pressure at the top of vessel 90 is about 330 mm. Hg., at the bottom about 140 mm. Hg., and near the mid point about 235 mm. Hg. The pressures in vessels 42, 56 and 70 are higher than the connection point of each vessel 90 so that vapor flows therefrom into vessel 90. About 300 pounds of water are removed from the calcium chloride stream and transferred to the sodium hydroxide stream. The evaporative cooling produces an effluent calcium chloride stream at 80° C., and the condensation produces a sodium hydroxide stream at 110° C.

*Example 2*

The procedure of Example 1 is repeated except that stream A is hot impure water at about 500° F. and stream B is water at about 250° F., and comparable results are obtained using elevated pressure (with appropriate bleed for non-condensibles in place of the vacuum connections).

*Example 3*

The procedure of Example 1 is repeated except that alcoholic solutions are used, and comparable results are obtained.

*Example 4*

The procedure of Example 1 is repeated except that heat is passed from an initially warm benzene solution or mixture to an initially cool aqueous solution; the benzene which is vaporized and then condensed remaining with the aqueous solution. Upon standing the benzene forms a separate phase or layer and is recovered by decanting.

In the broader aspect of the invention, heat is transferred from one material to another by means of evaporation in which a part of the material to be cooled is vaporized and the vapor is condensed on the material to be heated. If solvents are used in the two materials, they need not be the same or even miscible. In general, the requirement is that the vapor pressure of the vapor in the section where the vapor condenses be below the vapor pressure in the section where it is produced, under the substantially adiabatic conditions.

Any convenient number of vaporization stages may be used, with corresponding sequential vapor contact points or regions, but for many systems about three stages are preferred.

In view of the foregoing disclosures, variations and modifications thereof will be apparent to one skilled in the art, and it is intended to include within the invention all such variations and modifications except as do not come within the scope of the appended claims.

What is claimed is:

1. A distillation apparatus which comprises: a substantially cylindrical vertical vessel which is vertically partitioned into a (1) flashing section, (2) intermediate duct section and (3) condensing section; said flashing section being sub-divided by a plurality of horizontally disposed perforated plates into a top, a bottom, and at least one intermediate flashing sub-section; said duct section being vertically partitioned into a plurality of ducts, wherein one duct forms a passageway from the top flashing sub-section to the lowermost portion of said condensing section; wherein another duct forms a passageway from an intermediate flashing sub-section to an intermediate portion of said condensing section; and wherein still another duct forms a passageway from the bottom flashing sub-section to the uppermost portion of said condensing section; said ducts being adapted to convey vapors from said flashing sub-section to said condensing section; a first inlet means in the top flashing sub-section and a first outlet means from the lower portion of said condensing section; a second inlet means from the the upper portion of said condensing section and a second outlet means in the bottom flashing sub-section; and conduit means in said condensing section adapted to be connected to vacuum means.

2. A distillation apparatus which comprises: a vertical vessel which is vertically partitioned into a (1) flashing section, (2) intermediate duct section and (3) condensing section; said flashing section being sub-divided by a plurality of horizontally disposed plates into a top, a bottom, and at least one intermediate flashing sub-section; liquid transferring means for transferring liquid from said top and intermediate flashing sub-sections to the sub-section next below; said duct section being vertically partitioned into a plurality of ducts, each of said ducts forming a passageway between one of said flashing sub-sections and said condensing section; a first inlet means in the top flashing sub-section and a first outlet means from the lower portion of said condensing section; a second inlet means from the upper portion of said condensing section; and a second outlet means in the bottom flashing sub-section; and exhaust means in said condensing section adapted to be connected to vacuum means.

References Cited by the Examiner
UNITED STATES PATENTS

| | | | |
|---|---|---|---|
| 1,503,428 | 7/24 | Morterud | 261—22 |
| 1,661,403 | 3/28 | Barnebey | 202—67 X |
| 2,010,929 | 8/35 | Reich | 202—45 |
| 2,333,856 | 11/43 | Gerhold | 202—67 |
| 2,372,540 | 3/45 | Balcar | 202—49 |
| 2,462,013 | 2/49 | Waterman | 202—67 |
| 2,482,102 | 9/49 | Dahle | 261—18 |
| 2,489,703 | 11/49 | Cook et al. | 202—52 |
| 2,504,102 | 4/50 | Hall et al. | 202—52 |
| 2,633,929 | 4/53 | Farr | 261—18 |
| 2,749,094 | 6/56 | Lewis et al. | 202—158 X |
| 2,759,882 | 8/56 | Worthen et al. | 202—174 X |
| 3,062,516 | 11/62 | Hickman | 202—177 X |

NORMAN YUDKOFF, *Primary Examiner.*

GEORGE D. MITCHELL, ALPHONSO D. SULLIVAN, RICHARD D. NEVIUS, *Examiners.*